(12) United States Patent
Choi et al.

(10) Patent No.: US 9,172,089 B2
(45) Date of Patent: Oct. 27, 2015

(54) ANODE ACTIVE MATERIAL, METHOD OF PREPARING THE SAME, ANODE INCLUDING THE ANODE ACTIVE MATERIAL, AND LITHIUM BATTERY INCLUDING THE ANODE

(75) Inventors: Jae-man Choi, Hwaseong-si (KR); Han-su Kim, Seoul (KR); Moon-seok Kwon, Hwaseong-si (KR); Seung-sik Hwang, Seongnam-si (KR); Min-sang Song, Seongnam-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 1047 days.

(21) Appl. No.: 13/095,180

(22) Filed: Apr. 27, 2011

(65) Prior Publication Data

US 2011/0269024 A1 Nov. 3, 2011

(30) Foreign Application Priority Data

Apr. 28, 2010 (KR) ........................ 10-2010-0039498

(51) Int. Cl.
| | | |
|---|---|---|
| *H01M 4/13* | (2010.01) | |
| *H01M 4/58* | (2010.01) | |
| *H01M 4/36* | (2006.01) | |
| *H01M 4/38* | (2006.01) | |
| *H01M 4/485* | (2010.01) | |
| *H01M 10/052* | (2010.01) | |
| *H01M 4/02* | (2006.01) | |

(52) U.S. Cl.
CPC .............. *H01M 4/581* (2013.01); *H01M 4/366* (2013.01); *H01M 4/38* (2013.01); *H01M 4/485* (2013.01); *H01M 10/052* (2013.01); *H01M 2004/027* (2013.01); *Y02E 60/122* (2013.01); *Y02T 10/7011* (2013.01)

(58) Field of Classification Search
USPC .............. 429/218.1, 209, 231.5; 427/79, 115; 29/623.1–623.5; 252/182.1
See application file for complete search history.

(56) References Cited

U.S. PATENT DOCUMENTS

| | | | | |
|---|---|---|---|---|
| 5,980,977 | A | * | 11/1999 | Deng et al. ...................... 427/79 |
| 7,326,494 | B2 | | 2/2008 | Wang et al. |
| 2009/0208847 | A1 | | 8/2009 | Kang |

FOREIGN PATENT DOCUMENTS

| | | | | |
|---|---|---|---|---|
| JP | 5-275079 | | 10/1993 | |
| JP | 9-45330 | | 2/1997 | |
| JP | 11283626 A | * | 10/1999 | .............. H01M 4/58 |
| JP | 2000-243454 | | 9/2000 | |
| JP | 2005135872 A | | 5/2005 | |
| JP | 2005216855 A | | 8/2005 | |
| JP | 2006516803 A | | 7/2006 | |
| KR | 10-2009-0088625 | | 8/2009 | |
| KR | 1020090088625 A | | 8/2009 | |

OTHER PUBLICATIONS

Machine translation and Abstract in English of JP 11283626.*
Japanese Office Action with English Excerpt for Application No. 2011-101196 dated Oct. 7, 2014.

* cited by examiner

*Primary Examiner* — Barbara Gilliam
*Assistant Examiner* — Claire L Roe
(74) *Attorney, Agent, or Firm* — Cantor Colburn LLP

(57) ABSTRACT

An anode active material including: a core having a molybdenum-based material; and a coating layer formed on at least a portion of a surface of the core, wherein the coating layer comprises at least one material selected from the group consisting of molybdenum oxynitride and molybdenum nitride, a method of preparing the same, and an anode and a lithium battery.

14 Claims, 4 Drawing Sheets

ANODE ACTIVE MATERIAL, METHOD OF PREPARING THE SAME, ANODE INCLUDING THE ANODE ACTIVE MATERIAL, AND LITHIUM BATTERY INCLUDING THE ANODE

CROSS-REFERENCE TO RELATED APPLICATION

This application claims the benefit of Korean Application No. 10-2010-0039498, filed Apr. 28, 2010, in the Korean Intellectual Property Office, the disclosure of which is incorporated herein by reference.

BACKGROUND

1. Field

An aspect of the present invention relates to anode active materials, methods of preparing the same, anodes including the anode active materials, and lithium batteries including the anodes.

2. Description of the Related Art

Non-aqueous electrolytic secondary batteries including an anode containing a lithium-based compound are used in a wide range of applications due to their high voltage and high energy density. Electric vehicles, such as a hybrid electric vehicle (HEV) or a plug-in hybrid electric vehicle (PHEV), need to be charged with a large amount of electricity and discharge a large amount of electricity, and are used for a long period of time. Thus, they require a lithium battery having high capacity and excellent lifetime characteristics.

Metallic lithium has been often studied for use as an anode material due to its high battery capacity. However, metallic lithium is unstable and highly reactive, and thus, sensitive to heat or impacts, and thus, is explosive. An anode including metallic lithium may have a great amount of dendrite lithium at its surface during charging, and thus, may have a low charge/discharge efficiency or may be short-circuited with respect to a cathode.

An anode form of a carbonaceous material operates in a rocking-chair manner in which lithium ions existing in an electrolytic solution are intercalated into or deintercalated from between crystalline surfaces of the carbonaceous material, thereby performing oxidization/reduction reactions. A carbonaceous anode is porous, and thus, is resistant to volumetric expansion during charging or discharging, and thus, stable. However, the porous structure also attributes to a low battery capacity of the carbonaceous anode. For example, graphite having high crystallinity has a theoretical capacity of 372 mAh/g when used in $LiC_6$. The theoretical capacity described above is about 10% of a theoretical capacity of metallic lithium, that is, 3860 mAh/g. In addition, since the flat voltage of the carbonaceous anode is about 0 V with respect to metallic lithium, metallic lithium may precipitate at the surface of the carbonaceous anode.

Meanwhile, molybdenum-based oxide anodes ($MoO_2$ or the like) have a relatively low charge and discharge voltage (about 1.5 V vs. lithium (Li)), and high electrical capacity per unit volume and high electrical capacity per unit weight. However, molybdenum-based oxide electrodes undergo a large volume change during charging and discharging, and thus, lifetime characteristics thereof are deteriorated.

SUMMARY

According to aspects of the present invention, there are provided anode active materials including a nitride and/or oxynitride coating layer.

According to aspects of the present invention, there are provided methods of preparing the anode active materials.

According to aspects of the present invention, there are provided anodes including the anode active materials.

According to aspects of the present invention, there are provided lithium batteries including the anodes.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
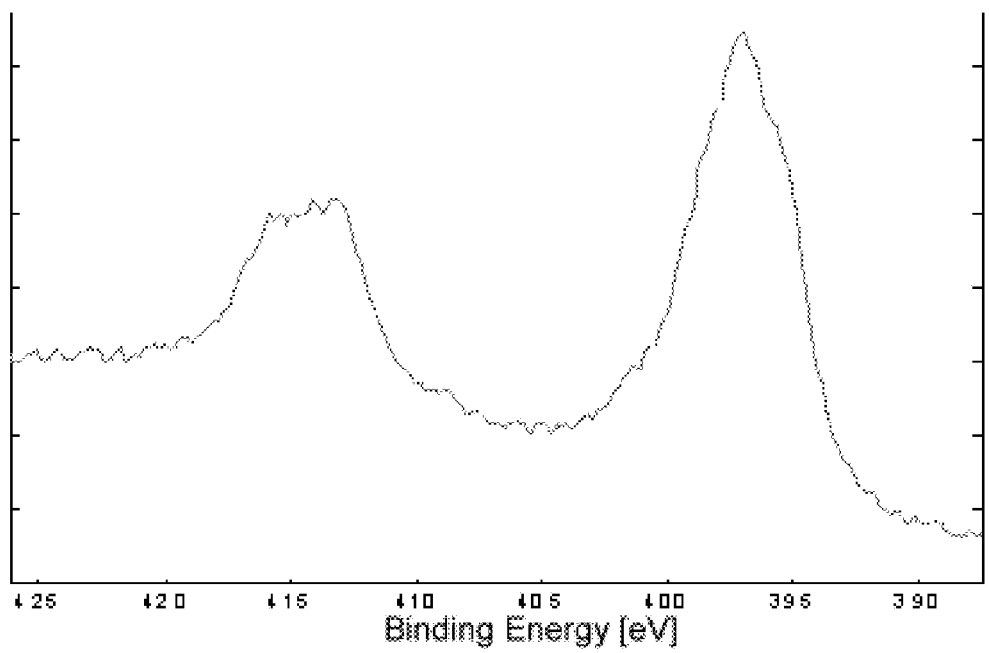
FIG. 1 shows X-ray photoelectron spectroscopy (XPS) test results of an anode active material powder prepared according to Example 2.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, anode active materials, methods of preparing the same, anodes including the anode active materials, and lithium batteries including the anodes will be described in detail with reference to exemplary embodiments.

An anode active material according to an embodiment of the present invention includes a core that contains a molybdenum-based material; and a coating layer formed on at least a portion of a surface of the core, wherein the coating layer includes at least one material selected from the group consisting of molybdenum oxynitride and molybdenum nitride. The molybdenum nitride and/or molybdenum oxynitride on a portion of the surface of the molybdenum-based material core has high conductivity and is rigid and thermally stable. Accordingly, the surface conductivity of the molybdenum-based material core may be improved and a volume change of the core during charging and discharging may be prevented. If the anode active material is used in a battery, the battery may have improved lifetime characteristics. The molybdenum based material means a material containing molybdenum and capable of intercalation and deintercalation of lithium ion.

The molybdenum nitride and/or molybdenum oxynitride-containing coating layer may be formed on a portion of the surface or on the entire surface of the molybdenum-based material core. If the molybdenum nitride and/or molybdenum oxynitride coating layer is formed on the entire surface of the molybdenum-based material core, the molybdenum-based material core may be completely covered by the molybdenum nitride and/or molybdenum oxynitride-containing coating layer.

The thickness of the coating layer may be in the range of about 5 to about 60 nm. For example, an average thickness of the coating layer may be in the range of about 10 to about 40 nm. If the average thickness of the coating layer is less than 5 nm, the effect obtained by forming the coating layer may be negligible, and on the other hand, if the average thickness of the coating layer is more than 60 nm, the coating layer may prevent intercalation of lithium ions. That is, the anode active material including the coating layer may show improved lifetime characteristics when the thickness of the coating layer is within the ranges described above.

Meanwhile, the coating layer has a peak in a binding energy range of 397 to 398 eV in an X-ray photoelectron spectroscopy (XPS) spectrum of the anode active material, and the peak represents a binding energy of a 3 p orbital of molybdenum and a 1 s orbital of nitrogen. Thus, it can be seen that the anode active material includes the coating layer including molybdenum nitride and/or molybdenum oxynitride at its surface. In addition, the peak of 397 to 398 eV and a peak of 396 to 397 eV representing a binding energy of Mo6+ contained in the anode active material overlap and thus an asymmetric peak is formed.

The molybdenum-based material may include at least one material selected from the group consisting of molybdenum oxides and molybdenum-containing alloys. However, the molybdenum-based material may also include other materials. In addition, the molybdenum-based material may include any molybdenum-based material that is available in the art. The molybdenum-based material comprises at least one material selected from the group consisting of a molybdenum oxide, a molybdenum alloy, and a composite of a molybdenum oxide and another metal oxide. For example, the molybdenum-based material may include at least one material selected from the group consisting of $MoO_2$, $MoO_3$, a W—Mo alloy, and a $WO_2$—$MoO_2$ composite.

An average diameter of the core containing the molybdenum-based material may be in the range of about 100 nm to about 10 μm. For example, the average diameter of the core may be in the range of about 500 nm to about 5 μm. The core may be a particle-phase powder. If the average diameter of the core is less than 100 nm, side effects may occur due to a surface resistance, and on the other hand, if the average diameter of the core is greater than 10 μm, interparticle contact may not be easy.

The molybdenum nitride may be represented by Formula 1:

$MoN_x$                                                                   <Formula 1> wherein 0.5<x<1.

The molybdenum oxynitride may be represented by Formula 2:

$MoO_yN_z$                                          <Formula 2> wherein 1<y<2, 0<z<1.

A method of preparing the anode active material according to an embodiment of the present invention includes contacting a molybdenum-based material with a nitrogen precursor gas. Due to the contacting, the molybdenum oxynitride and/or molybdenum nitride-containing coating layer is formed on at least a portion of the surface of the core including the molybdenum-based material. The molybdenum oxynitride and/or molybdenum nitride-containing coating layer may be formed on a portion of the surface or the entire surface of the core including the molybdenum-based material.

The nitrogen precursor gas may include ammonia gas, but is not limited thereto. The nitrogen precursor gas may be any gas that can be use as a nitrogen supply gas in the art.

The molybdenum-based material may include at least one material selected from the group consisting of molybdenum oxides and molybdenum alloys, but are not limited thereto. The molybdenum-based material may be any molybdenum-based material that is available in the art. The molybdenum-based material comprises at least one material selected from the group consisting of a molybdenum oxide, a molybdenum alloy, and a composite of a molybdenum oxide and another metal oxide. For example, another metal oxide may be oxide of Mn, Fe, Co, Ni, W and the like. For example, the molybdenum-based material may include at least one material selected from the group consisting of $MoO_2$, $MoO_3$, a W—Mo alloy, and a $WO_2$—$MoO_2$ composite.

The contacting of the molybdenum-based material and the nitrogen precursor gas may be performed at a temperature in the range of about 200° C. to about 800° C. For example, the contacting temperature may be in the range of about 350° C. to about 650° C., but is not limited thereto. The contacting temperature may be appropriately controlled as long as the objectives of the present invention are achieved.

The contacting time of the molybdenum-based oxide and the nitrogen precursor gas may be in the range of about 10 to about 60 minutes. If the contacting time is less than about 10 minutes, the coating layer having molybdenum nitride and/or molybdenum oxynitride formed on the surface of the core containing the molybdenum-based material may be too thin, and thus, the effect caused by formation of the coating layer may be negligible. On the other hand, if the contacting time is more than 60 minutes, the coating layer may be too thick, and thus, intercalation of lithium ions may be prevented. That is, with regard to the method described above, when the contacting time is within the range described above, an anode active material that enables a lithium battery with improved lifetime characteristics to be embodied is prepared.

An anode according to an embodiment of the present invention includes the anode active material. For example, the anode may be formed by forming an anode active material composition including the anode active material and a binder in a certain shape, or coating the anode active material composition on a current collector such as a copper foil.

For example, an anode active material composition including the anode active material, a conducting agent, a binder, and a solvent is prepared. The anode active material composition may be directly coated on a metallic current collector, thereby forming an anode plate. Alternatively, the anode active material composition is cast as a film onto a separate support and then, the film separated from the separate support is laminated on a metallic current collector, thereby forming an anode plate. The type of the anode may not be limited thereto.

The conducting agent may be carbon black or graphite particulates, but is not be limited thereto, and may be any material that may be used as a conducting agent in the art.

The binder may be a vinylidene fluoride/hexafluoropropylene copolymer; polyvinylidenefluoride(PVDF), polyacrylonitril, polymethylmethacrylate, polytetrafluoroethylene, or a mixture thereof; or a styrene butadiene rubber-based polymer, but is not be limited thereto. For example, the binder may be any material that may be used as a binder in the art.

The solvent may be N-methylpyrrolidone, acetone, or water, but is not limited thereto. For example, the solvent may be any solvent that is used in the art.

Amounts of the anode active material, the conducting agent, the binder, and the solvent may be the same as in a conventionally available lithium battery. According to the purpose and structure of a lithium battery, at least one of the conducting agent, the binder, and the solvent may not be used.

A lithium battery according to an embodiment of the present invention includes an anode including the anode active material.

A method of producing the lithium battery will now be described in detail. First, an anode is prepared according to the anode preparation method described above. Then, a cathode active material composition including a cathode active material, a conducting agent, a binder, and a solvent is prepared. The cathode active material composition may be directly coated on a metallic current collector and dried to prepare a cathode plate. Alternatively, the cathode active material composition may be cast as a film onto a separate support and then, the film peeled off the separate support is laminated onto a metallic current collector, thereby producing a cathode plate.

The cathode active material may be any lithium-containing metal oxide that is commercially available in the art. For example, the cathode active material may be $LiCoO_2$, $LiMn_xO_{2x}(x=1, 2)$, $LiNi_{1-x}Mn_xO_2(0<x<1)$, or $LiNi_{1-x-y}Co_xMn_yO_2(0\leq x\leq 0.5, 0\leq y\leq 0.5)$. For example, the cathode active material may be $LiMn_2O_4$, $LiCoO_2$, $LiNiO_2$, $LiFeO_2$, $V_2O_5$, $TiS$, or $MoS$, which are materials that enables intercalation/deintercalation of lithium.

The conducting agent, binder, and solvent of the cathode active material composition may be the same as in the anode active material composition. Meanwhile, a plasticizer may be further added to at least one of the cathode active material composition and the anode active material composition in order to form pores inside electrode plates.

Amounts of the cathode active material, the conducting agent, the binder, and the solvent may be may be the same as in a conventionally available lithium battery. According to the purpose and structure of a lithium battery, at least one of the conducting agent, the binder, and the solvent may not be used.

Then, a separator to be interposed between the cathode and the anode is prepared. The separator may be any separator that is used in a lithium battery. For example, the separator may be a material that has a low resistance to migration of ions of an electrolyte and an excellent electrolytic solution-retaining capability. For example, the separator may include a material selected from the group consisting of glass fiber, polyester, Teflon, polyethylene, polypropylene, polytetrafluoroethylene (PTFE), and a combination thereof, each of which may be nonwoven or woven. For example, a separator for use in a lithium ion battery may be a foldable separator formed of polyethylene or polypropylene, and a separator for use in a lithium ion polymer battery may be a separator having excellent organic electrolytic solution-retaining capability. For example, the separator may be manufactured using the following method.

A separator composition is prepared by mixing a polymer resin, a filler, and a solvent. The separator composition may be directly coated and dried on an electrode, thereby forming a separator. Alternatively, the separator composition is cast and dried on a support as a film and then the separator film peeled off the support is laminated on an electrode, thereby forming a separator.

A polymer resin that is used to produce the separator may not be limited, and may be any material that is used in a binder of an electrode plate. For example, the polymer resin may be a vinylidenefluoride/hexafluoropropylene copolymer, polyvinylidenefluoride (PVDF), polyacrylonitril, polymethylmetacrylate, or a combination thereof.

Then, an electrolyte is prepared. For example, the electrolyte may be an organic electrolytic solution. In another embodiment, the electrolyte may be solid. For example, the electrolyte may be boronoxide or lithiumoxynitride, but is not limited thereto. The electrolyte may be any solid electrolyte that is used in the art. The solid electrolyte may be formed on an anode by sputtering.

An example of preparing the organic electrolytic solution will be described. The organic electrolytic solution may be prepared by dissolving a lithium salt in an organic solvent.

The organic solvent may be any organic solvent that is used in the art. For example, the organic solvent may be selected from the group consisting of propylenecarbonate, ethylenecarbonate, fluoroethylenecarbonate, butylenecarbonate, dimethylcarbonate, diethylcarbonate, methylethylcarbonate, methyl propylcarbonate, ethylpropylcarbonate, methylisopropylcarbonate, dipropylcarbonate, dibutylcarbonate, benzonitril, acetonitril, tetrahydrofurane, 2-methyltetrahydrofurane, γ-butyrolacton, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, diethyleneglycol, dimethylether, and a combination thereof.

The lithium salt may be any lithium salt that is available in the art. Examples of the lithium salt may include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ where x and y are natural numbers, LiCl, LiI, and a combination thereof.

Figure 3:
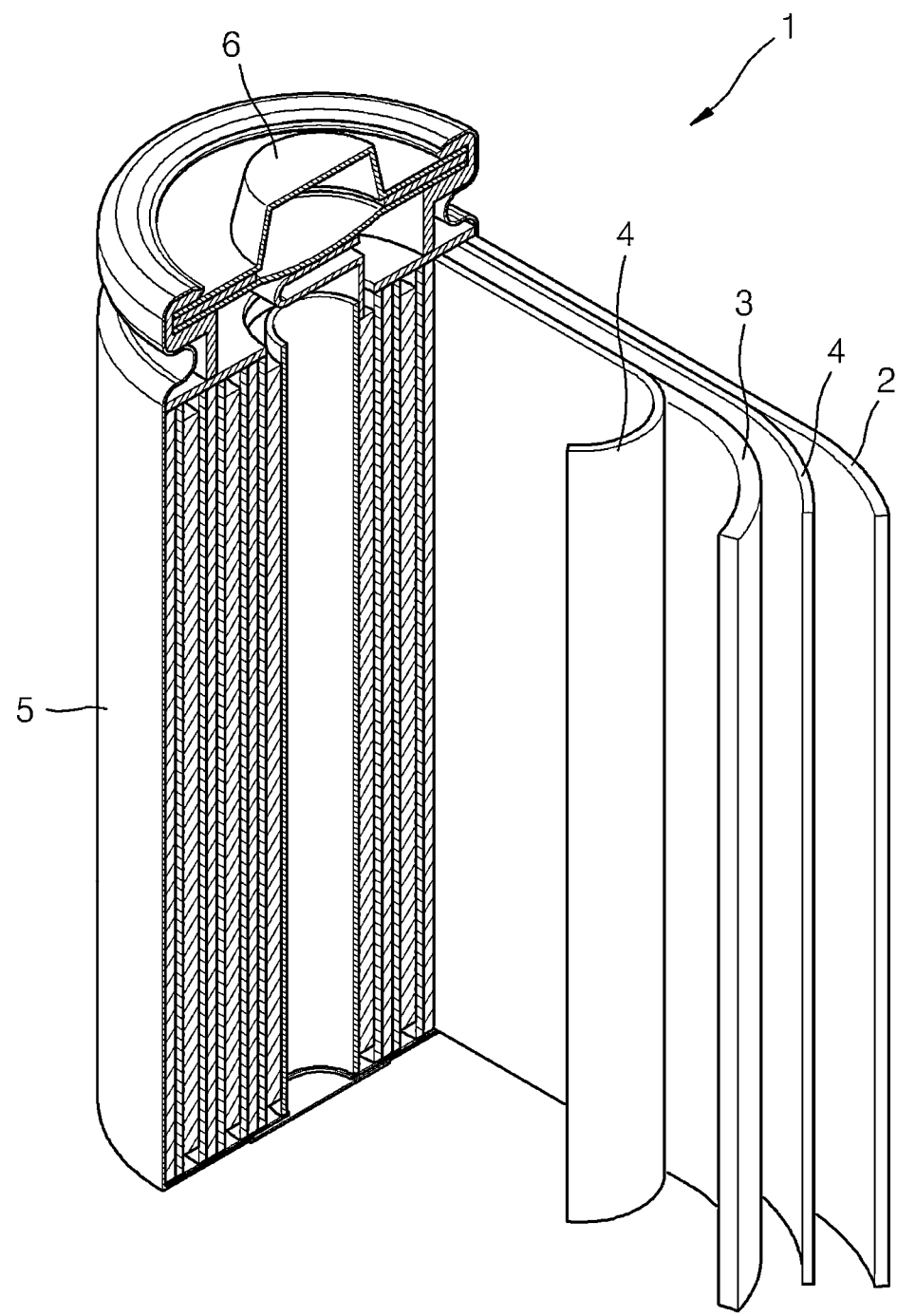
FIG. 3 is a schematic view of a lithium battery according to an embodiment of the present invention.

Referring to FIG. 3, a lithium battery 1 includes a cathode 3, an anode 2, and a separator 4. The cathode 3, the anode 2, and the separator 4 are wound or folded and accommodated in a battery case 5. Then, an organic electrolytic solution is loaded into the battery case 5 and the resultant structure is sealed with a cap assembly 6, thereby completing the manufacture of the lithium battery 1. The battery case 5 may be cylindrical, rectangular, or thin-film shaped. For example, the lithium battery 1 may be a thin-film shaped battery. The lithium battery 1 may be a lithium ion battery.

The separator 4 may be interposed between the cathode 3 and the anode 2 to form a battery assembly. If the lithium battery 1 is a lithium ion polymer battery, battery assemblies are stacked on one another in a bi-cell structure, immersed in an organic electrolytic solution, and then the obtained product is housed in a pouch and sealed.

In addition, a plurality of the battery assemblies may be stacked on one another to form a battery pack, and the battery pack is used in various devices requiring high capacity and high output. For example, the battery pact may be used in a notebook, a smart phone, or an electric vehicle.

The lithium battery described above has excellent lifetime characteristics and high thermal stability. Due to the features, the lithium battery is suitable for electric vehicles (EVs), such as plug-in hybrid electric vehicles (PHEVs).

Aspects of the present invention will be described in further detail with reference to the following examples. These examples are for illustrative purposes only and are not intended to limit the scope of the present invention.

Preparation of Anode Active Material

Example 1

1 g of $MoO_2$ that had an average diameter of 1 μm and that was synthesized by the inventors at room temperature was loaded into a silica tube, and then, argon gas (99.99%) was supplied thereto to remove oxygen and water. In order to stabilize the flow of gas, argon gas was supplied for 30 minutes and then, the furnace was heated at a rate of 7.5° C./minute from room temperature to a temperature of 400° C., and then maintained at a temperature of 400° C. for 30 minutes, and then heated at a rate of 5° C./minute until the temperature was 600° C. Then, the argon gas was exchanged with ammonia gas (99.98%) and supplied at a flow rate of 500 sccm (standard cubic centimeters per minute) for 10 minutes in order to perform nitridation, thereby forming a coating layer. When the reaction stopped, the furnace was cooled while supplying argon gas.

The coating layer formed by nitridation was identified by transmission electron microscopy (TEM) and the thickness of the coating layer was in the range of 5 nm to 10 nm and an average thickness of the coating layer was 7.5 nm.

Example 2

An anode active material was prepared in the same manner as in Example 1, except that the supply time of the ammonia gas was 20 minutes.

Figure 4:
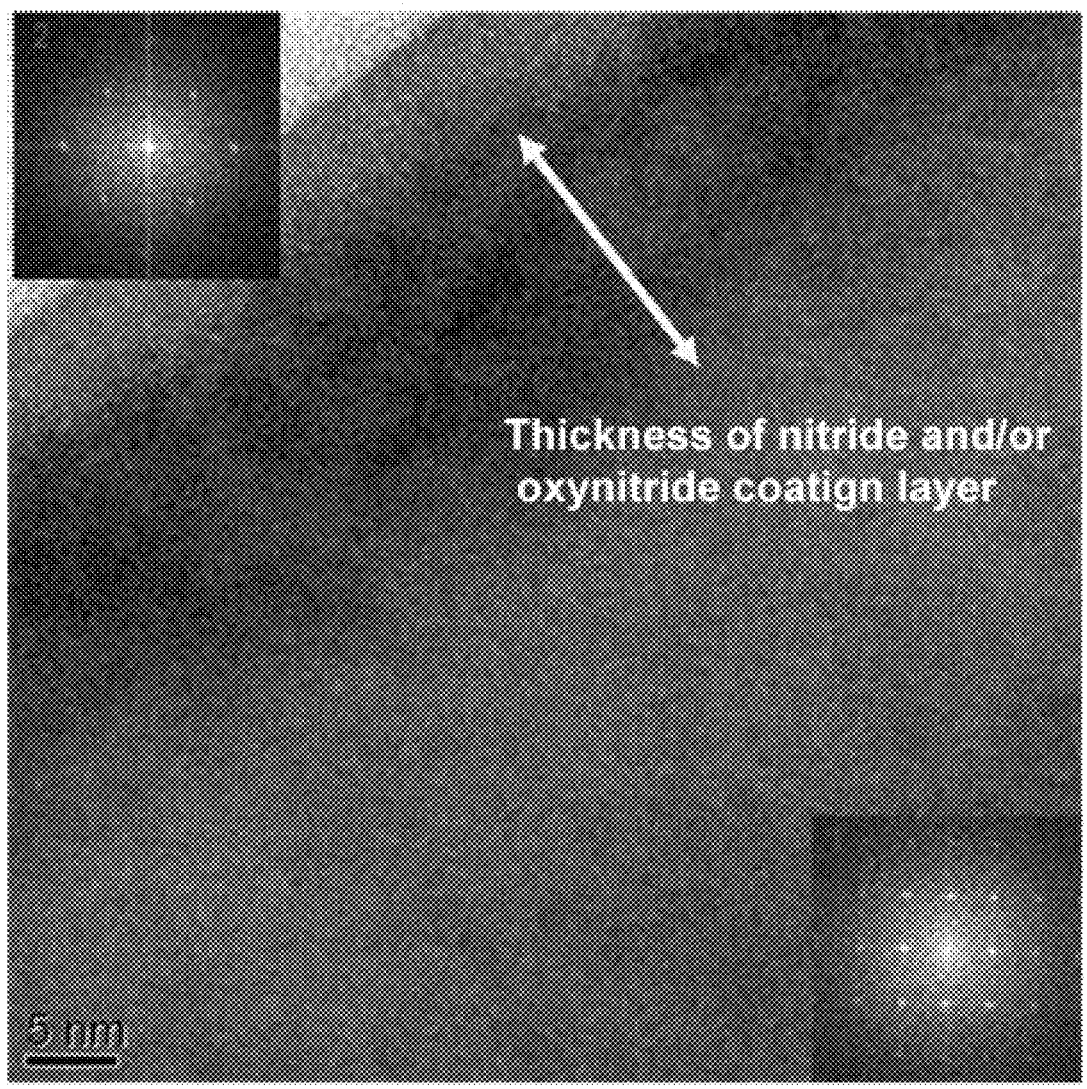
FIG. 4 is a transmission electron microscope (TEM) picture of an anode active material powder prepared according to Example 2.

The thickness of the coating layer formed by nitridation was in the range of 10 nm to 20 nm, and an average thickness of the coating layer was 15 nm, and the TEM image of the coating layer is shown in FIG. 4. In FIG. 4, the thickness of the coating layer is represented by an arrow.

Example 3

An anode active material was prepared in the same manner as in Example 1, except that the supply time of the ammonia gas was 40 minutes.

The thickness of the coating layer formed by nitridation was in the range of 20 nm to 40 nm, and an average thickness of the coating layer was 30 nm.

Example 4

An anode active material was prepared in the same manner as in Example 1, except that the supply time of the ammonia gas was 60 minutes.

The thickness of the coating layer formed by nitridation was in the range of 40 nm to 60 nm, and an average thickness of the coating layer was 50 nm.

Comparative Example 1

$MoO_2$ that had an average diameter of 1 μm, that was synthesized by the inventors, used in Example 1 and that was not subjected to nitridation was used as an anode active material.

Manufacture of Anode and Lithium Battery

Example 5

A mixture including the anode active material powder prepared according to Example 1, a carbon conducting agent (Super P), and polyvinylidenefluoride (PVdF) in a weight ratio of 8:1:1 was mixed together with N-methylpyrrolidone (NMP) in an agate mortar to prepare slurry. The slurry was coated on a copper current collector by using a doctor blade to form a coating layer having a thickness of about 20 μm and then the coating layer was dried at room temperature and then, dried at a temperature of 120° C., thereby producing an anode plate.

A CR-2016 standard coin cell was manufactured using the anode plate, a metallic lithium as a counter electrode, a PTFE separator, and as an electrolyte, a solution of 1.3M $LiPF_6$ dissolved in a mixed solution including ethylene carbonate (EC), diethylene carbonate (DEC), and fluoroethylene carbonate (FEC) (in a volume ratio of 2:6:2).

Example 6

A CR-2016 standard coin cell was manufactured in the same manner as in Example 5, except that the anode active material prepared according to Example 2 was used instead of the anode active material prepared according to Example 1.

Example 7

A CR-2016 standard coin cell was manufactured in the same manner as in Example 5, except that the anode active material prepared according to Example 3 was used instead of the anode active material prepared according to Example 1.

Example 8

A CR-2016 standard coin cell was manufactured in the same manner as in Example 5, except that the anode active material prepared according to Example 4 was used instead of the anode active material prepared according to Example 1.

Comparative Example 2

A CR-2016 standard coin cell was manufactured in the same manner as in Example 5, except that the anode active material prepared according to Comparative Example 1 was used instead of the anode active material prepared according to Example 1.

Evaluation Example 1

XPS Test

Figure 2:
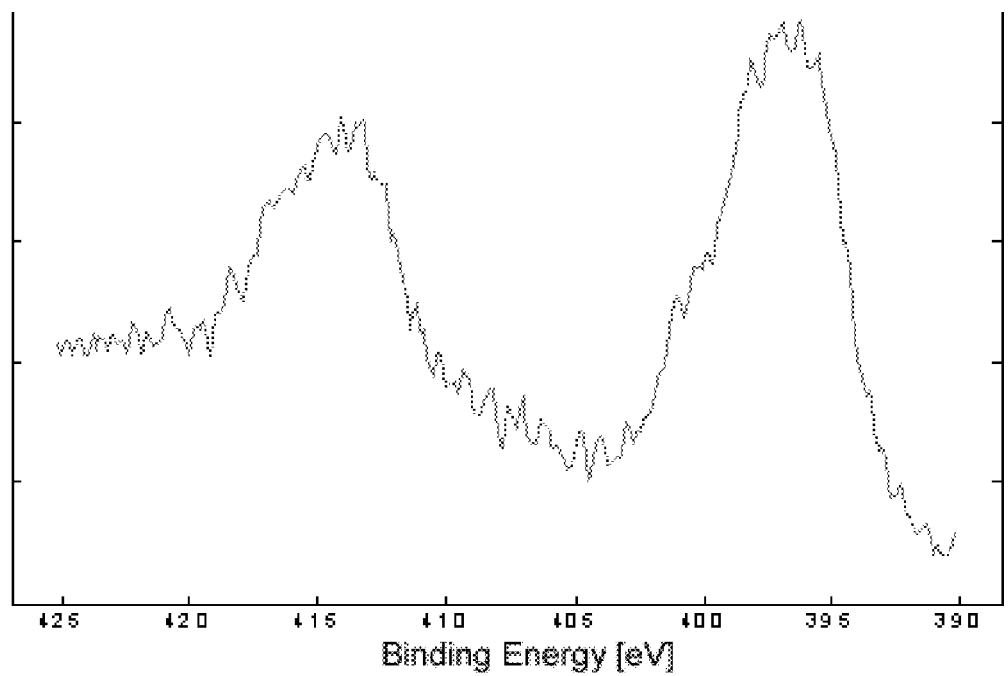
FIG. 2 shows XPS test results of an anode active material powder prepared according to Comparative Example 1.

An XPS test was performed on each of the anode active materials prepared according to Example 2 and Comparative Example 1, and the results are shown in FIG. 1 and FIG. 2, respectively.

Referring to FIG. 1, the anode active material including the molybdenum nitride and/or molybdenum oxynitride coating layer at its surface has a peak in a binding energy range of 397 to 398 eV, and the peak represents a binding energy of a 3p orbital of molybdenum and a 1 s orbital of nitrogen. Thus, it can be seen that the anode active material is covered by the coating layer including molybdenum nitride and/or molybdenum oxynitride. In addition, the peak of 397 to 398 eV and a peak of 396 to 397 eV representing a binding energy of Mo6+ contained in the anode active material overlap and thus an asymmetric peak is formed.

In addition, when the supply time of ammonia gas was longer, the thickness of the molybdenum nitride and/or molybdenum oxynitride coating layer formed at the surface of the anode active material was increased compared to the anode active material of Example 1.

An average thickness of the molybdenum nitride and/or molybdenum oxynitride coating layer formed at the surface of the anode active materials prepared according to Examples 1 to 4 is shown in Table 1.

TABLE 1

| | Average thickness [nm] |
|---|---|
| Example 1 | 7.5 |
| Example 2 | 15 |

TABLE 1-continued

| | Average thickness [nm] |
|---|---|
| Example 3 | 30 |
| Example 4 | 50 |

Evaluation Example 2

Charging and Discharging Test

The coin cells manufactured according to Examples 5 to 8 and Comparative Example 2 were charged with a constant current of 30 mA per 1 g of an anode active material until the voltage reached 0.7 V with respect to metallic lithium. After the charging, the coin cells were discharged with a constant current of 30 mA per 1 g of an anode active material until the voltage reached 3.0 V with respect to metallic lithium. Then, the charging and discharging was repeatedly performed 50 times with the same current in the same voltage range. The results are shown in Table 2. Capacity retention rates are shown in Equation 1 below.

Capacity retention rate [%]=[discharge capacity at a cycle of 50th/discharge capacity at a cycle of 1st]*100  <Equation 1>

TABLE 2

| | Capacity retention rate [%] |
|---|---|
| Example 5 | 84.61 |
| Example 6 | 89.54 |
| Example 7 | 88.42 |
| Example 8 | 82.21 |
| Comparative Example 2 | 82.00 |

Referring to Table 2, the lithium batteries manufactured according to Examples 5 to 8 have longer lifetime than the lithium battery manufactured according to Comparative Example 2. The lithium batteries manufactured according to Examples 6 and 7 including the molybdenum nitride and/or molybdenum oxynitride coating layer having the average thickness of 10 to 40 nm showed substantially improved lifetime characteristics compared to the lithium batteries manufactured according to Examples 5 and 8.

As described above, according to the one or more of the above embodiments of the present invention, inclusion of an anode active material including a molybdenum-based material-containing core covered by a nitride and/or oxynitride coating layer leads to an improved lifetime characteristic of a lithium battery.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An anode active material comprising:
a core particle that contains a molybdenum-based material; and
a coating layer formed on at least a portion of a surface of the core particle,
wherein an average diameter of the core particle is in the range of about 100 nm to about 10 µm and the coating layer comprises at least one material selected from the group consisting of molybdenum oxynitride and molybdenum nitride.

2. The anode active material of claim 1, wherein an average thickness of the coating layer is in a range of about 10 to about 40 nm.

3. The anode active material of claim 1, wherein the coating layer has a peak in a binding energy range of 397 to 398 eV in an X-ray photoelectron spectroscopy (XPS) spectrum.

4. The anode active material of claim 1, wherein the molybdenum-based material comprises at least one material selected from the group consisting of a molybdenum oxide, a molybdenum alloy, and a composite of a molybdenum oxide and another metal oxide.

5. The anode active material of claim 1, wherein the molybdenum-based material comprises at least one material selected from the group consisting of $MoO_2$, $MoO_3$, a W—Mo alloy, and a $WO_2$—$MoO_2$ composite.

6. The anode active material of claim 1, wherein the molybdenum nitride is represented by Formula 1:

$MoN_x$  <Formula 1>

wherein 0.5<x<1.

7. The anode active material of claim 1, wherein the molybdenum oxynitride is represented by Formula 2:

$MoO_yN_z$  <Formula 2>

wherein 1<y<2, and 0<z<1.

8. A method of preparing an anode active material comprising combining a molybdenum-based material with a nitrogen precursor gas, wherein as a result of combining the molybdenum-based material with the nitrogen precursor gas, a coating layer containing at least one material selected from the group consisting of a molybdenum oxynitride and a molybdenum nitride is formed on at least a portion of the molybdenum-based material, and an average diameter of a core particle that contains the molybdenum-based material is in the range of about 100 nm to about 10 µm.

9. The method of claim 8, wherein the nitrogen precursor gas comprises ammonia gas.

10. The method of claim 8, wherein the molybdenum-based material comprises at least one material selected from the group consisting of $MoO_2$, $MoO_3$, a W—Mo alloy, and a $WO_2$—$MoO_2$ composite.

11. The method of claim 8, wherein the combining of the molybdenum-based material with the nitrogen precursor gas is performed at a temperature in a range of about 200 to about 800° C.

12. The method of claim 8, wherein the combining of the molybdenum-based material with the nitrogen precursor gas continues for about 10 to about 60 minutes.

13. An anode comprising the anode active material of claim 1.

14. A lithium battery comprising the anode of claim 13.

* * * * *